May 16, 1939.  A. R. LINTERN  2,158,758
APPARATUS FOR HEATING MOTOR VEHICLES
Filed Oct. 2, 1936  2 Sheets-Sheet 1
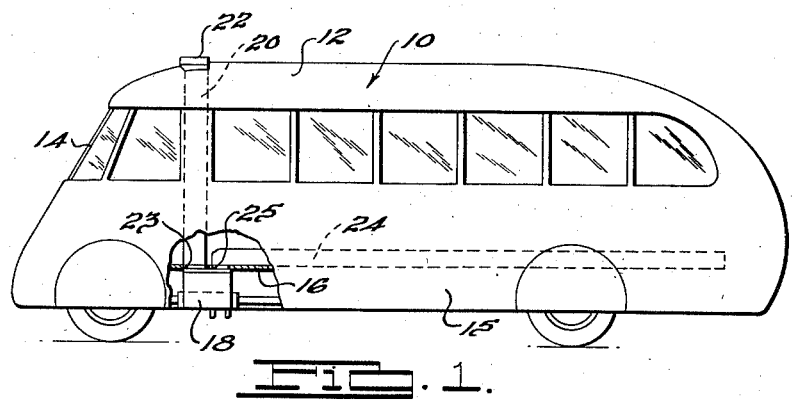
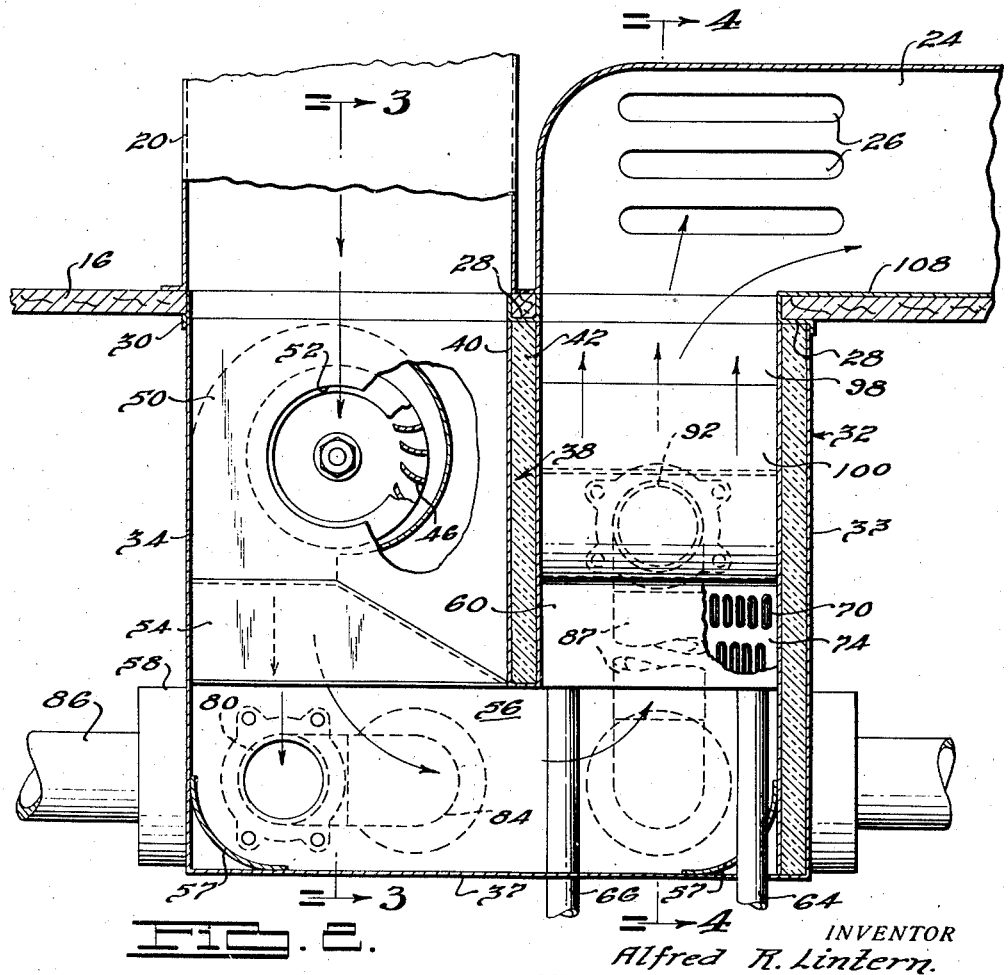
INVENTOR
Alfred R. Lintern.
BY
Harness, Dickey, Pierce & Hann.
ATTORNEYS.

May 16, 1939.　　　A. R. LINTERN　　　2,158,758
APPARATUS FOR HEATING MOTOR VEHICLES
Filed Oct. 2, 1936　　　2 Sheets-Sheet 2
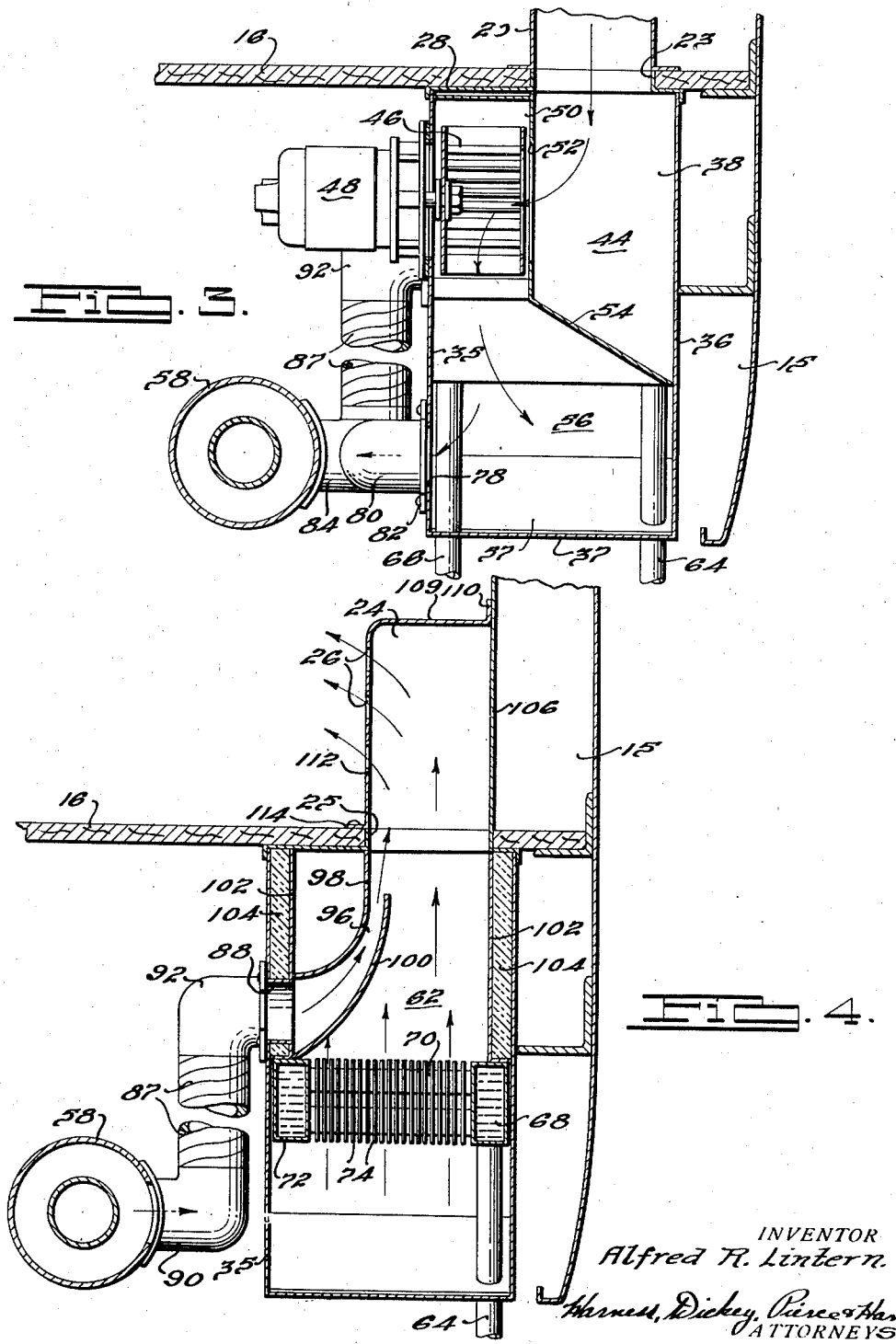
INVENTOR
Alfred R. Lintern.
ATTORNEYS.

Patented May 16, 1939

2,158,758

UNITED STATES PATENT OFFICE 2,158,758

APPARATUS FOR HEATING MOTOR VEHICLES

Alfred R. Lintern, Detroit, Mich., assignor to Evans Products Company, Detroit, Mich., a corporation of Delaware Application October 2, 1936, Serial No. 103,647

3 Claims. (Cl. 237—12.3)

This invention relates to vehicles and in particular relates to apparatus for ventilating the interior of the vehicles with fresh warm air.

Objects of this invention are to heat air before introducing it into the passenger compartment of a vehicle by an arrangement of an exhaust heater and a water heater in which the heating effect of one supplements that of the other so that the air introduced into the passenger compartment is substantially uniform in temperature at all times; to so arrange the exhaust heater and the water heater relative to each other and with the means which forces the air through the heater that the air discharged from the hot water heater assists in drawing the air through the exhaust heater without loss of air volume due to friction of the exhaust heater; to provide a heating assembly which may conveniently be installed on conventional vehicles with a minimum of alterations, and to provide a rugged structure which is economical to manufacture and install.

Other objects of the invention will become apparent from the following specification, the drawings relating thereto and from the claims hereinafter set forth.

In the drawings, in which like numerals are used to designate like parts in the several views throughout:

Figure 1 is a side elevational view with a part broken away embodying features of the present invention;

Fig. 2 is an enlarged vertical cross-sectional view of structure illustrating an embodiment of the present invention;

Fig. 3 is a cross-sectional view taken substantially along the line 3—3 of Fig. 2; and Fig. 4 is a cross-sectional view taken substantially along the line 4—4 of Fig. 2.

The present invention particularly relates to apparatus for use on large commercial passenger vehicles; and in such vehicles in cold weather it is necessary to constantly supply the passenger compartment with fresh warm air of a substantially uniform temperature. The present invention provides for heating the air before it is injected into the passenger compartment by passing it through an exhaust heater and a hot water heater, each of these heaters being so arranged relative to each other that they supplement each other in heating effects so that the air entering the vehicle is substantially uniform in temperature. Hot water heaters, in which the heating water is supplied from the water cooling system for the engine, are most efficient when the vehicle is idling or the vehicle is operating at relatively low speed; and exhaust heaters are most efficient when the vehicle is operating at high rates of speed. By passing a portion of the air to be heated through a hot water heater, and the other portion through an exhaust heater and uniting them in a common discharge conduit before discharge into the passenger compartment it can be seen that each heater will supplement the other one to give a balanced and uniform heating effect on the air discharged into the passenger compartment. That is, for example, when the vehicle is operating at a high rate of speed although the water heater is least efficient under such a condition, the exhaust heater is most efficient and under this condition the air passing through the exhaust heater will be heated to a greater extent than the air passed through the hot water heater; and when these two streams are intermingled in a common conduit a mean temperature is reached which will be substantially uniform for various speeds of operation of the vehicle.

In the present invention after the air has been passed in separate streams through the hot water heater and the exhaust heater, respectively, it is joined in a common chamber and conduit which discharges into the interior of the vehicle. When one of the separated streams is passed through the exhaust heater, there is a tendency to reduce the air volume passing through the exhaust heater because of the friction of the relatively restricted exhaust heater passages. In the present invention, the common discharge chamber is provided with a restricted area in the path of the stream from the hot water heater; and the stream from the exhaust heater enters the common chamber adjacent the end of this restricted area. The effect of this arrangement is that the stream of air passed through the hot water heater and the restricted area expands upon leaving the restricted area and creates a relatively low pressure in the common chamber adjacent the point at which the stream of air from the exhaust heater is discharged thereinto. As there is a relatively higher pressure at the other end of the exhaust heater, the air will pass through the exhaust heater without loss of air volume due to friction of the exhaust heater passages.

In ventilating the passenger compartments of large passenger vehicles it is desirable to supply air from a source free of contaminating gases; and the present invention contemplates drawing the air from a region immediately above the roof adjacent the forward wall of the vehicle as at this region the air is freest from such foul contaminating gases.

Referring to the drawings, in Fig. 1 a large passenger vehicle 10 is illustrated embodying the preferred features of the present invention. The vehicle 10 comprises a roof portion 12, a forwardly facing wall 14, including a windshield, and side walls 15 forming a closed body having a passenger compartment inside with a floor portion 16. An air heating unit 18 is provided preferably under the floor portion 16 adjacent the front of the vehicle close to the region at which the engine (not shown) is located.

Fresh outside air is conducted to the heater from a point above the roof 12 adjacent the front of the vehicle by means of a conduit 20 which is preferably located adjacent one side of the vehicle and extends through the roof, the top portion of the conduit having a projecting portion 22 with a forwardly facing opening immediately above the roof. After the air has been heated in the heaters, it is discharged into the passenger compartment through a conduit 24 extending longitudinally of the vehicle within the passenger compartment and having suitable openings 26 at spaced intervals along the length of the conduit. The conduits 20 and 24 communicate with openings 23 and 25, respectively, in the floor portion 16 for purposes to be more fully described hereinafter.

The heating unit 18 is preferably mounted under the floor portion 16 immediately beneath the openings 23 and 25 in the floor portion and is concealed from view by the side or apron 15. The heating unit 18 is substantially rectangular in cross section and comprises a top portion 28 having openings formed by upstanding flanges which are complementary in shape and fit within the openings 23 and 25, respectively. The top portion 28 is provided with a downwardly extending peripheral flange 30 which fits over and is in secure engagement with the upper edge of a main casing portion 32 of the heater unit. The main casing portion 32 includes side walls 33, 34, 35 and 36 and a bottom wall 37 forming a closed unit within which the ducts and heating means, to be hereinafter described in greater detail, are located.

In order to provide within the interior of the casing an inlet compartment and an outlet compartment, a transversely extending baffle 38 extends from beneath the floor portion 16 between the openings 23 and 25 downwardly within the casing 32 for a substantial distance. The baffle 38 comprises a substantially U-shaped metal member 40 forming spaced walls between which insulation 42 is provided.

An air inlet compartment 44, in communication with the duct 20, is provided within the casing by the baffle 38 and has located therein an induction fan 46, of suitable known construction, which is driven by a motor 48. The fan 46 is enclosed within the chamber 44 by means of a casing 50 having an opening 52 therethrough in operative alignment with the fan 46 through which air is drawn from the inlet chamber 44 into and through the induction fan. The bottom portion of the casing 50 is flared outwardly as at 54 and forms the upper confining wall of a chamber 56 into which the air drawn by the fan is discharged.

From the chamber 56 the air is separated into a pair of separate streams, one of the streams passing through an exhaust heat exchanger 58 and the other of the streams passing through a hot water heater 60, in a manner to be described. In order to reduce turbulence in air flow, transversely extending curved plates 57 are mounted adjacent the corners of the chamber 56.

A discharge chamber 62 communicating with the discharge duct 24 is formed by the baffle 38 within the casing 32. The hot water heater 60, which may be one of the known types, is positioned within the discharge chamber 62 so that one of the pair of streams of air passes therethrough.

In the embodiment illustrated the hot water heater 60 includes inlet and outlet hot water pipes 64 and 66 which are suitably connected to the water cooling system of the engine in a manner well known. The inlet pipe 64 communicates with a header 68 which is connected by means of transversely extending tubes 70 to an opposite header 72, with which the outlet pipe 66 is in communication. Heat conducting fins 74 are arranged in the hot water heater structure in heat transfer relation with the tubes 70 and extend longitudinally of the discharge chamber 62 forming air passages therebetween for the air stream to be heated by the hot water heater.

To provide a conduit for the other of the pair of air streams, an opening 76 is provided in the wall 35 communicating with the chamber 56 and over which an elbow conduit 80 having flanged portions 82 is suitably secured to the outer face of the wall 35. A reversely directed elbow conduit 84 communicates with the outlet end of the conduit 80 and is in communication with the interior of the exhaust heater 58 through a suitable opening in the casing of the exhaust heater. An exhaust conduit 86 which extends from the vehicle engine in the usual way extends through the casing of the exhaust heater 58 which encloses a portion of the exhaust pipe 86. Air from the conduits 80 and 84 passes into and through the exhaust heater 58 in intimate heat exchange relation with the exhaust pipe 86, and is discharged from the exhaust heater 58 through an opening in the exhaust heater casing through a flexible conduit 87 from which the air is discharged into the discharge chamber 62 through an opening 88 in the wall 35. The conduit 87 is provided with suitable fittings 90 and 92 adjacent its ends communicating the conduit 86 with the interior of the exhaust heater and the chamber 62, respectively.

As there is a tendency to retard that stream of air passing through the exhaust heater because of the friction of the relatively restricted passages therein, the volume of air passing through the exhaust heater would be reduced by this friction. In order that the air passing through the exhaust heater will not be reduced in volume due to friction, a relatively restricted area is created within the common discharge chamber 62 in the path of the stream from the hot water heater. By restricting this area and then enlarging the area relative to the area of the passage through the hot water heater adjacent the point at which the stream of air from the exhaust heater is discharged into the common chamber 62, a relatively low pressure is created adjacent the outlet end of the exhaust conduit which assists in drawing the air through the exhaust heater without loss in volume.

A simple construction for forming the relatively restricted area comprises a plate member 98 extending transversely of the chamber 62 and curved downwardly to a point adjacent the top of the opening 88 and forming one confining wall of a chamber 96. Another confining wall is formed by a transversely extending plate member 100 also extending transversely of the chamber 62 from a point adjacent the lower edge of the opening 88 and extending upwardly to the chamber 62. The chamber 96 is thus formed by the members 98 and 100, the chamber being over the opening 88 and having a greater area than the opening 88 so that a back pressure will not be created in the exhaust heater.

In order to reduce heat losses through the casing 32 in the region of the discharge chamber 62 and in the region of the location of the exhaust of the hot water heater, spaced wall members 102 are provided between which and the outer walls of the casing 32 insulating material 104 is placed.

The restricted area above referred to is that area immediately above the hot water heater 70 which is defined by the plate members 100 and 102. Referring particularly to Fig. 4, it is evident that this area is restricted as compared to the area of the passage through the hot water heater. This area is then enlarged immediately above the top edge of the member 100 so that a relatively low pressure is created adjacent the outlet of the exhaust conduit 96. This enlargement is defined by that portion of the member 98 above the top edge of the member 100 and the plate 102.

In order to provide a simplified structure for the exhaust conduit 24, the exhaust conduit is formed by utilizing an inner side wall panel 106 adjacent the bottom thereof as one of the confining walls for the channel, the remaining confining walls of the channel comprising a plate member 108 extending along the upper face of the floor portion 16 and an L-shaped member 109 having a substantially horizontal top portion with an outwardly directed flange 110 suitably secured to the inner wall panel 106 and a downwardly extending side portion 112 having an outwardly directed flange 114 suitably secured to the upper face of the floor portion 16. The openings 26 are preferably provided in the downwardly extending portion 112 at suitably spaced intervals along the length of the conduit 24, but it is to be understood that such openings could also be provided in the horizontal portion 109 if desired.

In operation, air is caused to enter the single conduit 20 either by the forward movement of the vehicle or by the fan 46 or by both and passes downwardly through the conduit 20 into the inlet chamber 44. From the inlet chamber 44 the air is drawn by the fan 46 through the fan and into the common chamber 56 from which it is divided into a pair of separate streams. One of the separate streams passes through the hot water heater in intimate heat exchange relation therewith into the discharge chamber 62; and the other separate stream passes outwardly through the opening 78 to and through the exhaust heater 58 and is discharged into the discharge conduit through the chamber 96. The two separate streams of air are intimately intermingled within the chamber 62 and are discharged from this chamber through the opening 35 into the conduit 24 and from the conduit 24 into the interior of the passenger compartment.

As discussed above, for different vehicle operating conditions the heating effects or efficiencies of the hot water heater and the exhaust heater vary considerably. For example, during low speeds of operation the hot water heater is most efficient so that the air passing therethrough is heated to a greater extent than when the vehicle is operating at high speed; while at low speeds of operation the exhaust heater is least efficient and does not heat the air to the same extent as it does when the vehicle is operating at high speeds. As under one condition of operation one of the heaters is most efficient while the other is least efficient, and for a different condition of operation the other heater is most efficient while the first heater is least efficient, it is evident that the heaters supplement each other under the various conditions of operation; and by intermingling the two separate streams of air before discharge into the passenger compartment, it is evident that a substantially uniform temperature of the air discharged into the passenger compartment may be maintained with the consequent uniform maintenance of temperature within the passenger compartment.

Formal changes may be made in the specific embodiment of the invention described without departing from the spirit and substance of the broad invention, the scope of which is commensurate with the appended claims.

What I claim is:

1. In combination, an automotive vehicle having a closed body, and an engine, means forming an air confining conduit communicating with the exterior of the body, means forming an air confining conduit communicating with the interior of the body, a pair of separate conduits connecting said first and second named means, one of said pair of conduits including an exhaust heat exchanger which derives its source of heat from the exhaust products of the engine and the other of said pair of conduits having located therein a water heat exchanger which derives its source of heat from the cooling system of the engine, and means to force air into said body through said first and second named means and through said pair of conduits in heat exchange relation with said heat exchangers.

2. In combination, an automotive vehicle having a closed body and an engine, a first conduit forming an air confining passage therethrough including an exhaust heat exchanger which derives its source of heat from the exhaust products of the engine, a second conduit forming an air confining passage therethrough having located therein a water heat exchanger which derives its source of heat from the cooling system of the engine, said first and second named conduits being arranged in parallel, means forming a common air inlet conduit for said first and second conduits, means forming a common discharge conduit for said first and second conduits communicating with the interior of the body, means communicating said first conduit with said last named means beyond the region of communication of said second conduit with the last named means, and means to force air into the body through said pair of conduits and said first and second named means in heat exchange relation with said heat exchangers.

3. In combination, an automotive vehicle having a closed body and an engine, a first conduit forming an air confining passage therethrough including an exhaust heat exchanger which derives its source of heat from the exhaust products of the engine, a second conduit forming an air confining passage therethrough having located therein a water heat exchanger which derives its source of neat from the cooling system of the engine, said first and second named conduits being arranged in parallel, means forming a common air inlet conduit for said first and second conduits, means forming a common discharge conduit for said first and second conduits communicating with the interior of the body, a member communicating said first conduit with said last named means beyond the region of communication of said second conduit with said last named means, said member being so constructed and arranged that the discharge of air from the second conduit creates a relatively low pressure within said last named means compared to the air pressure within the first conduit to assist the passage of air through said exhaust heat exchanger, and means to force air into the body through said pair of conduits and said first and second named means in heat exchange relation with said heat exchangers.

ALFRED R. LINTERN.